(12) United States Patent
Steinberg et al.

(10) Patent No.: US 6,832,016 B2
(45) Date of Patent: Dec. 14, 2004

(54) FIBER ARRAY SWITCH HAVING MICROMACHINED FRONT FACE WITH ROLLER BALLS

(75) Inventors: Dan A Steinberg, Blacksburg, VA (US); David W Sherrer, Blacksburg, VA (US); Mindaugas F Dautartas, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 217 days.

(21) Appl. No.: 09/728,896

(22) Filed: Dec. 1, 2000

(65) Prior Publication Data

US 2002/0181854 A1 Dec. 5, 2002

Related U.S. Application Data

(60) Provisional application No. 60/201,347, filed on May 2, 2000, and provisional application No. 60/197,154, filed on Apr. 13, 2000.

(51) Int. Cl.[7] .................................................. G02B 6/26
(52) U.S. Cl. ............................ 385/20; 385/14; 385/25; 385/49; 385/147
(58) Field of Search ........................ 385/16, 17, 20–22, 385/24–25, 49, 129–130, 147, 14

(56) References Cited

U.S. PATENT DOCUMENTS

| | | |
|---|---|---|
| 3,864,018 A | 2/1975 | Miller |
| 4,120,923 A | 10/1978 | Kloker et al. |
| 4,150,870 A | 4/1979 | d'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,859,022 A | 8/1989 | Opdahl et al. |
| 4,900,118 A | 2/1990 | Yanagawa et al. |
| 4,932,745 A | 6/1990 | Blonder |
| 4,973,127 A | 11/1990 | Cannon, Jr. et al. |

(List continued on next page.)

FOREIGN PATENT DOCUMENTS

| | | |
|---|---|---|
| JP | 6385522 | 4/1988 |
| JP | 1999305151 A | 11/1999 |

Primary Examiner—Frank G. Font
Assistant Examiner—Michael P. Mooney
(74) Attorney, Agent, or Firm—Niels Haun; Jonathan D. Baskin

(57) ABSTRACT

An optical fiber switch having two coupled fiber arrays which move in a transverse direction to provide switching action. Each array has a front face and the front faces are nearly in contact. Optical fiber ends are located at the front faces. The front faces of the fiber arrays have transverse grooves in which rolling spheres are disposed. The fiber arrays move by rolling on the spheres. The spheres provide for smooth transverse motion and a fixed distance between optical fiber arrays. The spheres and front face grooves also provide for alignment between the optical fibers.

17 Claims, 14 Drawing Sheets

U.S. PATENT DOCUMENTS

| | | | |
|---|---|---|---|
| 5,044,711 A | | 9/1991 | Saito |
| 5,123,073 A | | 6/1992 | Pimpinella |
| 5,127,084 A | | 6/1992 | Takahashi |
| 5,135,590 A | | 8/1992 | Basavanhally et al. |
| 5,177,804 A | * | 1/1993 | Shimizu et al. ............... 385/20 |
| 5,179,609 A | * | 1/1993 | Blonder et al. ............... 385/89 |
| 5,181,216 A | | 1/1993 | Ackerman et al. |
| 5,185,825 A | | 2/1993 | Shigematsu et al. |
| 5,185,846 A | | 2/1993 | Basavanhally et al. |
| 5,187,758 A | | 2/1993 | Ueda et al. |
| 5,257,332 A | | 10/1993 | Pimpinella |
| 5,297,228 A | | 3/1994 | Yanagawa et al. |
| 5,337,384 A | | 8/1994 | Basavanhally et al. |
| 5,357,590 A | | 10/1994 | Auracher |
| 5,379,361 A | | 1/1995 | Maekawa et al. |
| 5,390,266 A | | 2/1995 | Heitmann et al. |
| 5,440,655 A | | 8/1995 | Kaplow et al. |
| 5,461,683 A | | 10/1995 | Harman |
| 5,483,608 A | | 1/1996 | Yokomachi et al. |
| 5,499,309 A | | 3/1996 | Kozuka et al. |
| 5,500,910 A | | 3/1996 | Boudreau et al. |
| 5,500,911 A | | 3/1996 | Roff |
| 5,555,333 A | | 9/1996 | Kato |
| 5,566,262 A | | 10/1996 | Yamane et al. |
| 5,568,585 A | | 10/1996 | Kramer |
| 5,602,951 A | | 2/1997 | Shiota et al. |
| 5,611,006 A | | 3/1997 | Tabuchi |
| 5,623,564 A | * | 4/1997 | Presby ........................ 385/20 |
| 5,699,463 A | | 12/1997 | Yang et al. |
| 5,732,167 A | | 3/1998 | Ishiko et al. |
| 5,778,123 A | * | 7/1998 | Hagan et al. ................. 385/76 |
| 5,785,825 A | | 7/1998 | Hwang et al. |
| 5,828,800 A | * | 10/1998 | Henry et al. .................. 385/20 |
| 5,901,262 A | | 5/1999 | Kobayashi et al. |
| 5,909,524 A | | 6/1999 | Tabuchi |
| 5,920,665 A | | 7/1999 | Presby |
| 6,045,270 A | | 4/2000 | Weiss et al. |
| 6,056,696 A | | 5/2000 | Kallman |
| 6,064,781 A | | 5/2000 | Seibold et al. |
| 6,101,299 A | | 8/2000 | Laor |
| 6,118,917 A | | 9/2000 | Lee et al. |
| 6,160,936 A | | 12/2000 | You et al. |
| 6,234,687 B1 | | 5/2001 | Hall et al. |
| 6,320,997 B1 | | 11/2001 | Dautartas et al. |
| 6,328,479 B1 | | 12/2001 | Schofield et al. |
| 6,393,174 B1 | | 5/2002 | Karaguleff et al. |
| 6,393,175 B1 | | 5/2002 | Jurbergs et al. |
| 6,477,303 B1 | | 11/2002 | Witherspoon |
| 6,519,382 B1 | | 2/2003 | Jurbergs et al. |
| 2001/0041026 A1 | | 11/2001 | Steinberg et al. |
| 2002/0025104 A1 | | 2/2002 | Steinberg et al. |
| 2002/0025107 A1 | | 2/2002 | Heiks et al. |
| 2002/0028037 A1 | | 3/2002 | Steinberg et al. |
| 2002/0146194 A1 | | 10/2002 | Sherrer et al. |
| 2003/0108272 A1 | | 6/2003 | Sherrer et al. |

* cited by examiner

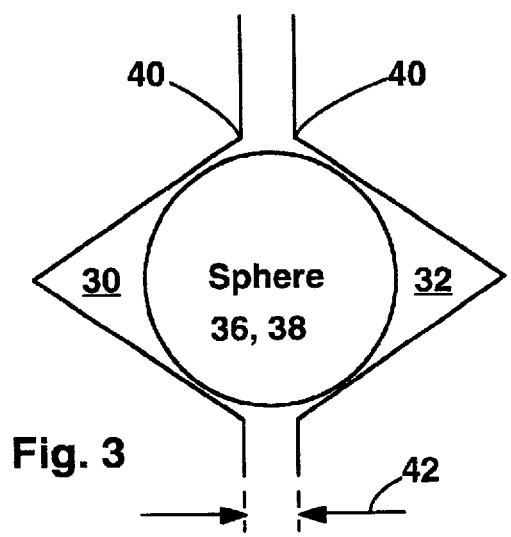
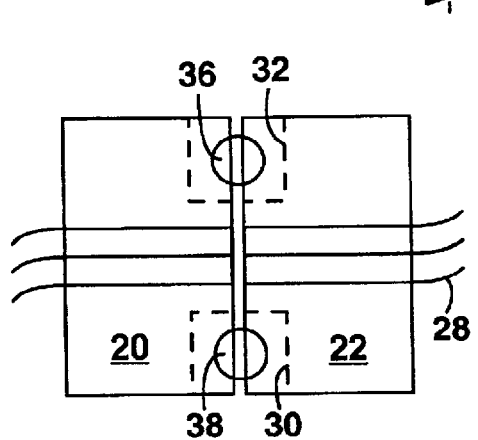
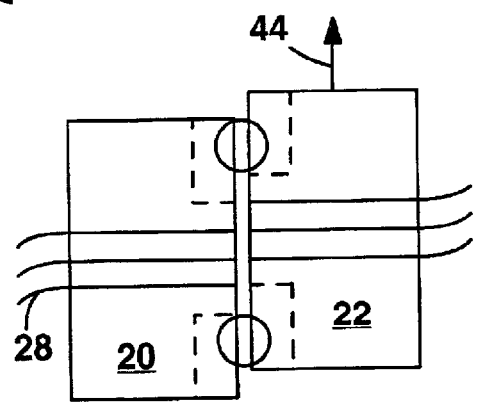
Fig. 4a            Fig. 4b
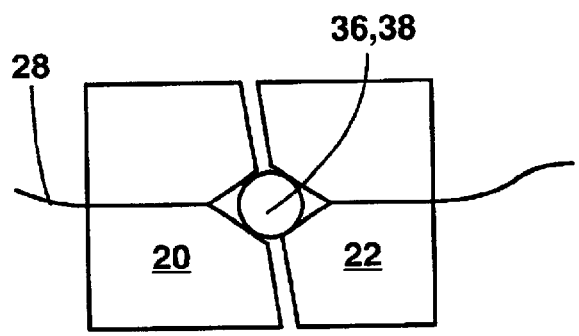
Fig. 5

FIBER ARRAY SWITCH HAVING MICROMACHINED FRONT FACE WITH ROLLER BALLS

RELATED APPLICATIONS

The present application claims the benefit of priority of copending provisional patent applications 60/197,154 filed on Apr. 13, 2000, and 60/201,347 filed on May 02, 2000 which are hereby incorporated by reference.

FIELD OF THE INVENTION

The present invention relates generally to optical switches. More particularly, the present invention relates to an optical switch comprising two fiber arrays facing each other. Relative lateral translation of the fiber arrays provides switching action.

BACKGROUND OF THE INVENTION

Optical switches are used in optical data networks. Many varieties of optical switches have been invented, and different switches required for different applications. Switches are typically characterized by their switching speed, insertion loss, and connectivity (the number of connections that can be provided).

Optical computer networks will require inexpensive optical switches that are easy to manufacture and mechanically robust. Such switches may be mechanical in nature because they do not typically require high speed. Also, such switches should have a relatively high connectivity capability.

U.S. Pat. No. 5,623,564 to Presby teaches an optical switch having silica waveguide chips. The chips are facing each other so that the waveguides are butt-coupled. Switching action is provided by sliding the chips transversely with respect to one another. The device can provide low insertion loss.

U.S. Pat. No. 4,699,457 to Goodman teaches an optical fiber switch having fibers mounted on two blocks. One block can slide with respect to the other to provide switching action. The sliding motion is provided my a magnetic actuator.

U.S. Pat. No. 5,828,800 to Henry et al. teaches a sliding mechanical optical switch. The switch has two outer waveguide arrays and a central array that is movable. Switching action is provided by moving the central array.

U.S. Pat. No. 5,177,804 to Shimizu et al. teaches an optical switch having abutted fiber arrays which provide switching action when displaced laterally. The fiber arrays have slots for providing mechanical stops.

U.S. Pat. No. 4,150,870 to d'Auria teaches an optical fiber switch having bundles of fibers that can move laterally to provide switching action.

U.S. Pat. No. 5,699,463 to Yang et al. teaches an optical fiber switch having laterally translatable fiber arrays. A lens is disposed between the fiber arrays to provide relaxed alignment requirements.

U.S. Pat. No. 5,187,758 to Ueda et al. teaches an optical fiber switch having laterally translatable fiber arrays. The switch is made by cutting a single fiber array into two pieces. The fiber arrays have equal fiber spacing because they are made from the same V-groove chips.

U.S. Pat. No. 5,185,825 to Shigematsu et al. teaches an optical fiber switch having laterally translatable fiber arrays. The fiber arrays have slots for alignment pins that provide mechanical stops for switch positions.

U.S. Pat. No. 5,555,333 to Kato teaches an optical device for aligning an optical fiber array with optical components such as photodetectors. A photodetector chip has bumps for mechanically aligning with V-grooves in the optical fiber array.

U.S. Pat. No. 5,179,609 to Blonder et al. teaches an optical subassembly or connecting optical fibers and an optical device such as a photodetector. Optical fibers are disposed in V-grooves of a V-groove chip and the V-groove chip has pits on a front face for engaging mechanical features of a submount chip. The optical fibers are oriented perpendicularly with respect to the submount chip.

U.S. Pat. No. 5,778,123 to Hagan et al. teaches an optical fiber connector having alignment balls on the front surfaces of the connector. Fiber-fiber alignment is provided by mechanical contact between the connector and the alignment balls.

It would be an advance in the art of optical fiber switches to provide a mechanically robust switch with improved fiber-fiber alignment.

OBJECTS AND ADVANTAGES OF THE INVENTION

Accordingly, it is a primary object of the present invention to provide a mechanical optical fiber switch that:

1) is mechanically tough and robust;

2) is simple to assemble;

3) provides low insertion loss and is capable of high connectivity; and 4) provides good fiber-fiber mechanical alignment.

5) can be used with a wide variety of actuator devices.

These and other objects and advantages will be apparent upon reading the following description and accompanying drawings.

SUMMARY OF THE INVENTION

These objects and advantages are attained by an optical fiber switch having a first fiber array and a second fiber array. Each fiber array has a front face and an optical fiber terminating at the front face. Each fiber array also has a front face groove extending in a transverse direction. At least two spheres are disposed between the fiber arrays in the front face grooves so that the fiber arrays move in a transverse direction by rolling on the spheres. Transverse motion provides switching action by aligning and misaligning the optical fibers.

Preferably, the fiber arrays are made from anisotropically etched silicon chips. The front face grooves can be made by anisotropic etching.

Preferably, the spheres contact surfaces of the front face grooves, and not corners of the front face grooves.

Also preferably, the front face grooves and spheres are designed so that the optical fibers are spaced apart by a distance in the range of about 0.5–15 microns.

Also, the front faces of the fiber arrays can be angled to reduce backreflection.

The front face grooves can also have notches for providing passive transverse alignment.

The present invention includes an embodiment having a movable fiber array disposed between two stationary arrays. The movable array and stationary arrays have front face grooves and spheres are disposed in the grooves. The movable array moves in a transverse direction between the stationary arrays by rolling on the spheres.

DESCRIPTION OF THE FIGURES

FIG. 3 shows a close-up side view of a sphere disposed in two front face grooves.

FIGS. 4a–4b illustrate the operation of the present optical fiber switch.

FIG. 5 shows a side view of a preferred embodiment where the front face is angled to reduce back reflection.

FIG. 25 shows the chip after anisotropic etching, and FIG. 26 shows the chip of FIG. 25 after cutting with a dicing saw.

DETAILED DESCRIPTION

The present invention provides an optical fiber switch with transversely movable fiber arrays. The fiber arrays have transverse grooves on their front faces. Spheres (e.g. ball lenses) are disposed in the grooves between the two fiber arrays. The fiber arrays move laterally by rolling on the spheres. The spheres provide for a fixed separation between the fiber arrays and for smooth sliding motion between the arrays.

Figure 1:
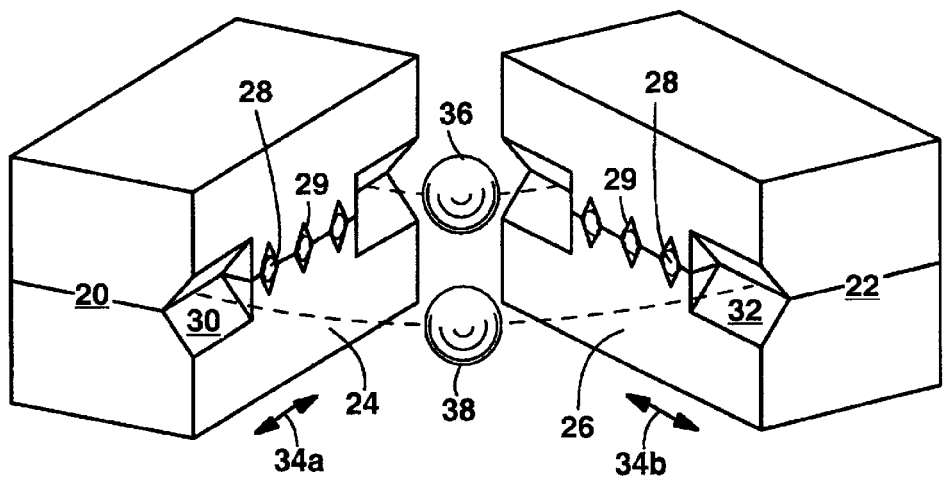
FIG. 1 shows an exploded view of the present optical fiber switch.

FIG. 1 shows an exploded perspective view of the present optical fiber switch. The switch has two fiber arrays 20 22 with front faces 24 26. Each fiber array has optical fibers 28 disposed in V-grooves 29.

Preferably, the fiber arrays are made from V-groove chips (e.g. anisotropically etched silicon V-groove chips). The optical fibers have endfaces that are preferably polished and coplanar with the front faces 24 26.

Each front face 24 26 has a front face groove 30 32. The front face grooves 30 32 extend in a transverse direction across the front face. The transverse direction is the direction the arrays move to provide switching action; the transverse direction is indicated by the arrows 34a 34b. The transverse direction is seen differently for the two arrays because of the exploded view. Preferably, the front face grooves in the two arrays are have the same size and shape.

Two spheres 36 38 are disposed in the front face grooves between the fiber arrays 20 22. The spheres may be made of silica, alumina, glass, metal, ceramic or any other hard durable material. The spheres are preferably accurately spherical and preferably have a diameter in the range of about 100–1000 microns. Ball lenses commonly used in the microoptics industry can be used as the spheres.

Figure 2:
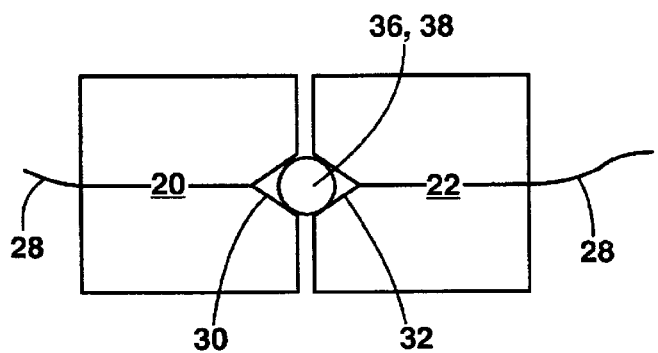
FIG. 2 shows a side view of the present optical fiber switch.

FIG. 2 shows a cross-sectional side view of the present optical fiber switch. The spheres 36 38 are disposed in the front face grooves 30 32. The optical fibers 28 extend from the rear of the fiber arrays 20 22.

FIG. 3 shows a magnified side view of the sphere in the front face grooves. Preferably, the sphere contacts surfaces (shown here as flat surfaces) of the front face grooves, and not corners 40 of the grooves. A gap distance 42 between the array front faces 24 26 is preferably in the range of about 0.5–15 microns. If the optical fiber endfaces are coplanar with the front faces, the distance between the optical fiber ends is equal to the gap distance 42.

FIG. 4a and 4b show top views of the present optical fiber switch illustrating the switching action. In FIG. 4b, fiber array 22 is displaced in the transverse direction 44. Motion of the fiber array 22 in the transverse direction changes the connectivity of the switch, as known in the art. Motion of the fiber array can be provided by any precise linear actuator such as a piezoelectric actuator, stepper motor, solenoid or the like. Mechanisms for translating optical fiber arrays are known the art and many are applicable to the present invention.

The fiber arrays 20 22 move smoothly by rolling on the spheres 36 38. Preferably, the front face grooves 30 32 have a hard, wear-resistant coating made of silicon nitride or other nitrides or carbides. The spheres can also have a hard, wear resistant coating.

FIG. 5 shows a side view of a preferred embodiment where the front faces of the fiber arrays are oriented at an angle from perpendicular to the optical fiber. The optical fiber endfaces are coplanar with the front faces, so this helps to reduce backreflections.

Figure 6:
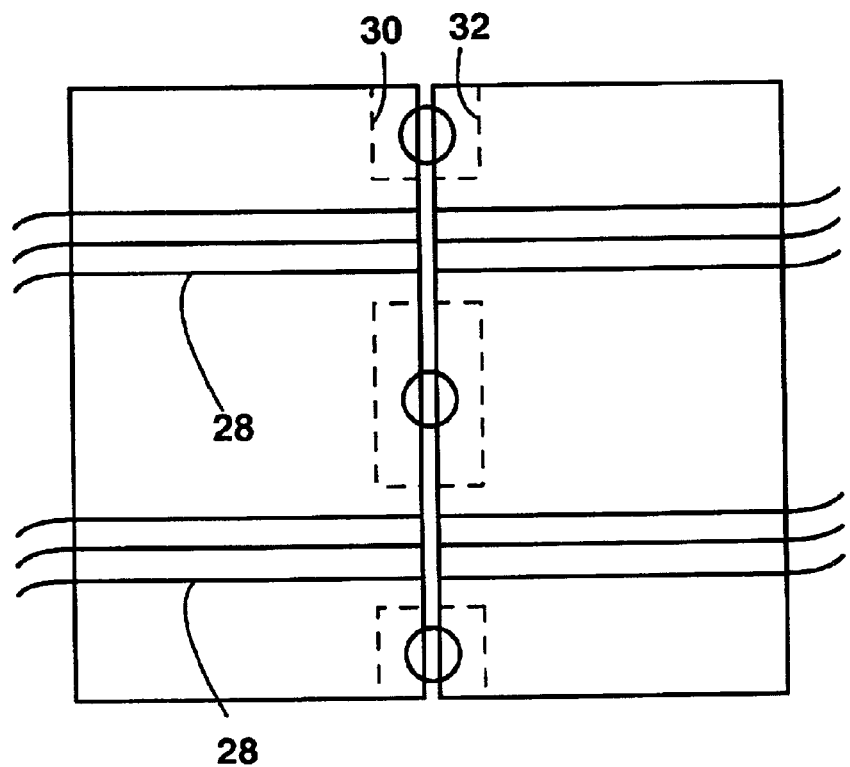
FIG. 6 shows a top view of the present switch having three front face grooves.

FIG. 6 shows a top view of another embodiment of the present invention where each fiber array 20 22 has three front face grooves. Three spheres are disposed in the front face grooves.

Figure 7:
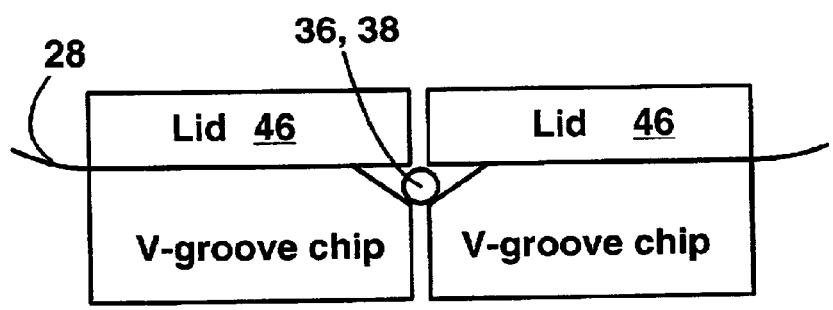
FIG. 7 shows a side view of an embodiment where the arrays have a flat top lid.

FIG. 7 shows a side view of another, less preferred embodiment of the present invention where the fiber arrays each comprise a single chip with a front face groove. Each fiber array has a lid 46 that is flat and therefore does not contribute to the front face groove.

Figure 8:
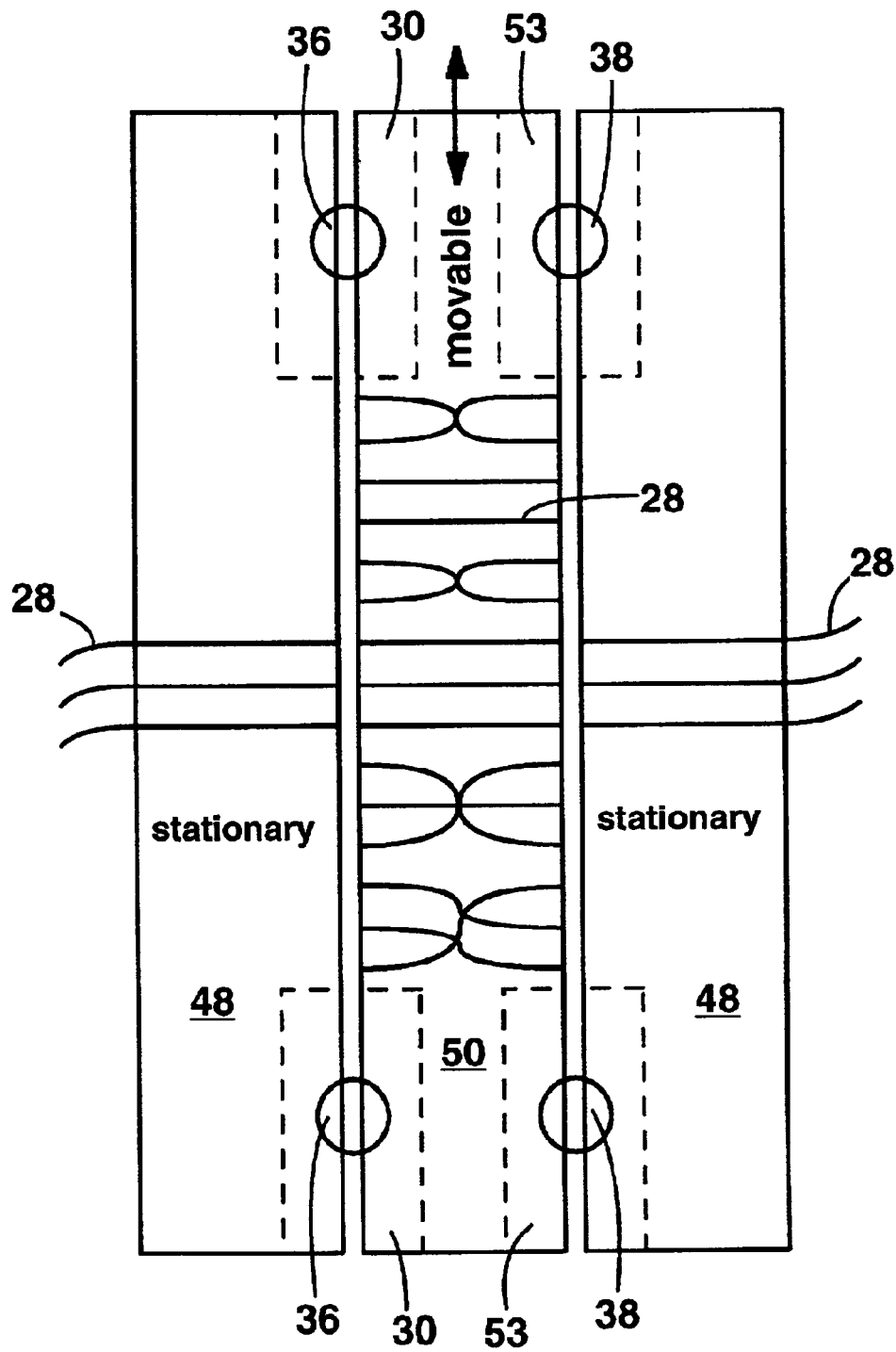
FIG. 8 shows an embodiment having a movable array disposed between two stationary arrays.

FIG. 8 shows another embodiment of the present invention having two stationary fiber arrays 48, and a single, movable array 50 disposed between the stationary arrays. The movable array rolls on spheres 36 38 disposed in front face grooves 30 and rear face grooves 53 (the front face grooves 30 and rear face grooves 53 are preferably identical). Both the movable array and stationary arrays have front face grooves 30 indicated by dotted lines. The movable array has optical fibers or other waveguides that are arranged (e.g. cross over one another) to provide different connections for different positions of the movable array. Alternatively, the 'stationary' arrays are movable and the 'movable' array is stationary (depending on the reference frame used).

Figure 9:
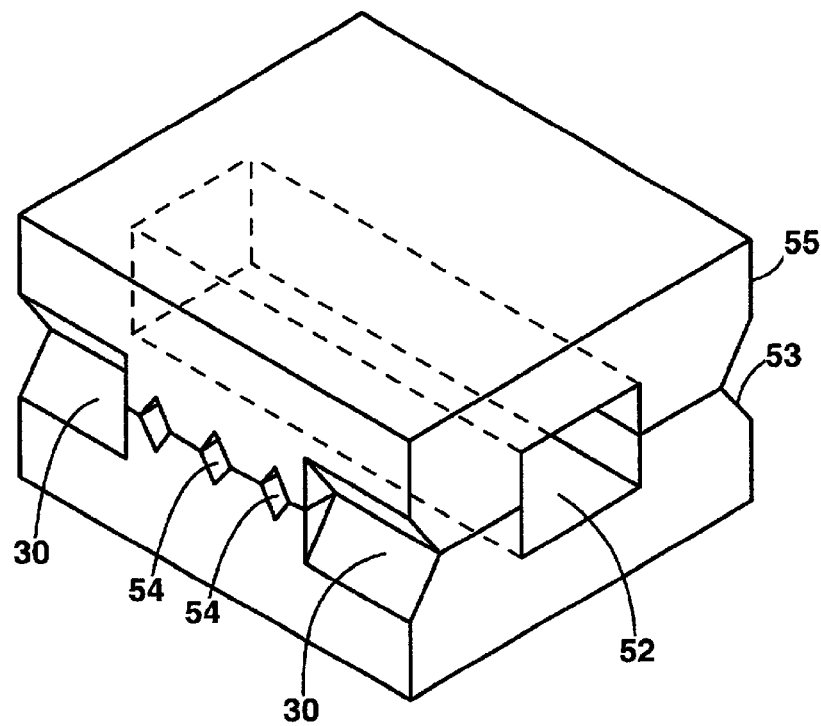
FIG. 9 shows a perspective view of a preferred movable array having an opening.

FIG. 9 shows a perspective view of a preferred embodiment of the movable array in the device of FIG. 8. The movable array has front face grooves 30 and rear face grooves 53 on a rear face 55 (not visible). The movable array has an opening 52 in the middle of the array. The opening 52 provides space for optical fibers to cross over one another. This allows the optical fibers to have different positions on each side of the movable array, which is necessary to provide switching action. V-grooves 54 are also shown, but without optical fibers. The movable array can be made of silicon and the opening can be formed by a dicing saw or chemical etching. Preferably, the V-grooves 54 and front face grooves 30 are made by anisotropic etching of silicon.

Figure 10:
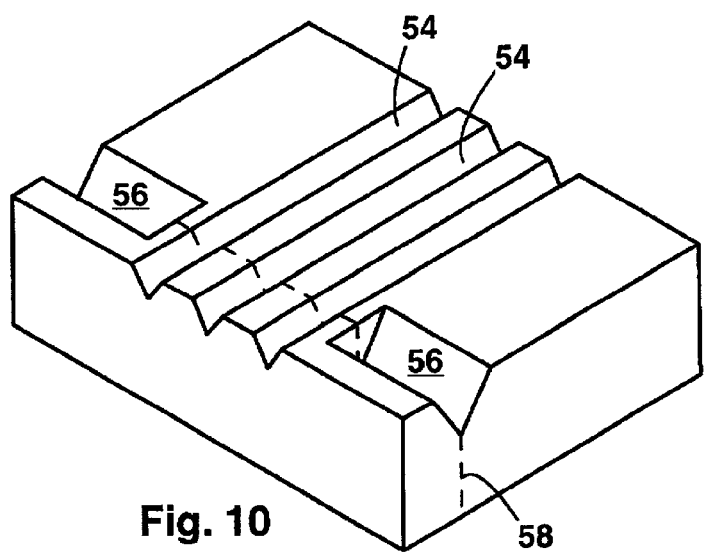
FIG. 10 shows a preferred micromachined chip for use in making the present optical fiber arrays.

FIG. 10 shows a perspective view of a single chip used to make the fiber arrays having front face grooves according to the present invention. The chip has V-grooves 54 for optical fibers. The chip also has V-grooves 56 for forming the front face grooves 30. Preferably, the V-grooves 54 and V-grooves 56 are made by anisotropic etching of silicon (e.g. using KOH solution or EDP). After the V-grooves 54 56 are formed, the chip is cut with a dicing saw along dotted line 58.

Figure 11:
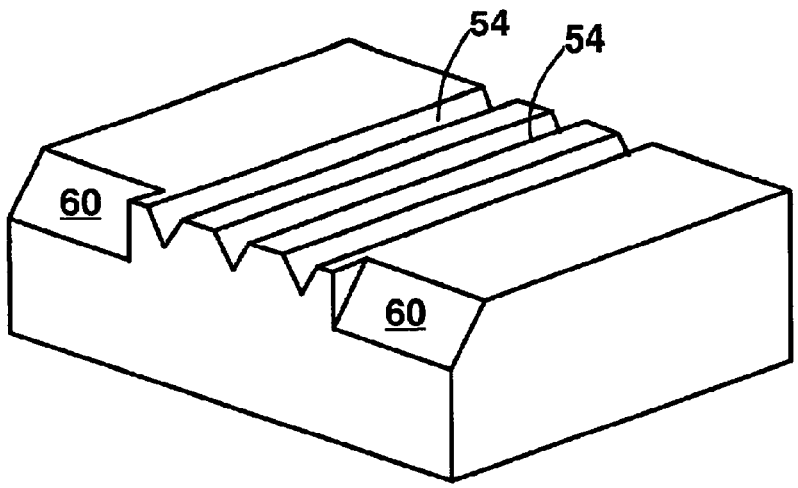
FIG. 11 shows a chip for making the present fiber arrays with a front face groove.

FIG. 11 shows a chip made according to the method illustrated in FIG. 10. Sloped surfaces 60 form a front face groove when two chips are mated together.

Figure 12A:
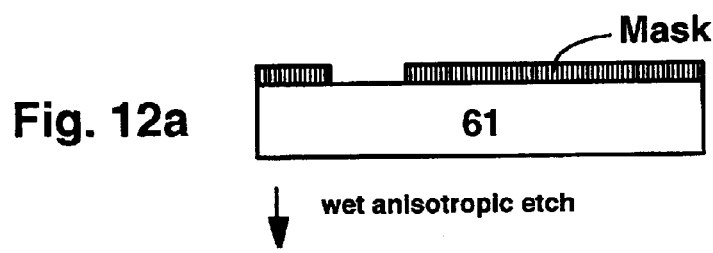
FIGS. 12a–12e illustrate a preferred method for making a fiber array with front face groove.

FIGS. 12a–12e shows a side view of the preferred method for making the present fiber array chips:

FIG. 12a: Pattern mask on a silicon chip 61. The mask can be made of silicon nitride, for example.

Figure 12B:

FIG. 12b: Expose masked chip to anisotropic wet etchant, thereby forming V-groove 56.

Figure 12C:
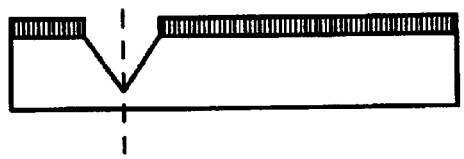

FIG. 12c: Cut chip 61 with a dicing saw in the area of the V-groove 56. Preferably, the cut is made along the bottom corner of the V-groove 56.

Figure 12D:
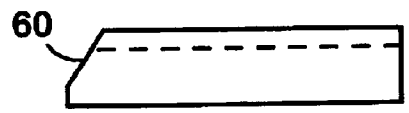

FIG. 12d: Optionally, the mask is removed.

Figure 12E:
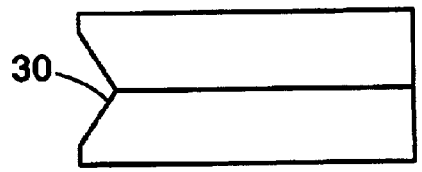

FIG. 12e: Two chips are assembled so that the sloped surfaces form a front face groove 30.

Figure 13A:
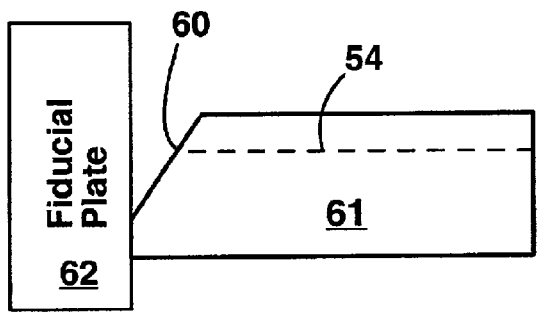
FIGS. 13a–13d illustrate a preferred method for locating an optical fiber so that a fiber endface is coplanar with the fiber array front face.
Figure 13B:
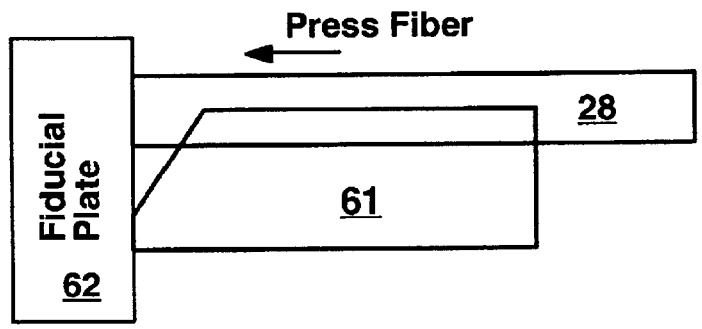
Figure 13C:
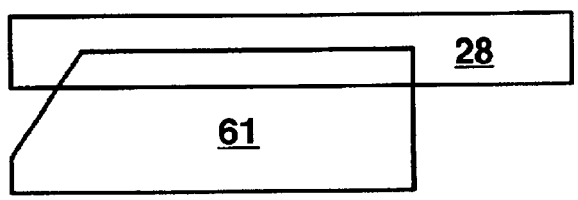

FIGS. 13a–13c illustrate a preferred method for locating an optical fiber in the array so that the fiber endface is coplanar with the front face of the array:

FIG. 13a: a fiducial plate 62 is pressed against the front face of the V-groove chip 61. V-groove 54 for the optical fiber seen from the side and is shown as a dotted line.

FIG. 13b: the optical fiber 28 is pressed against the fiducial plate 62 and the optical fiber is glued or bonded in place.

FIG. 13c: the fiducial plate 62 is removed. Preferably, the optical fiber has a polished endface.

Figure 13D:
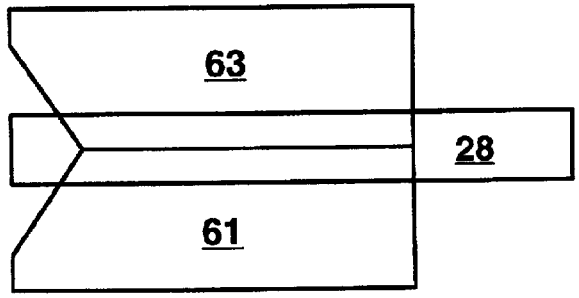

FIG. 13d: After the fiducial plate is removed, a second V-groove chip 63 is placed on top of the optical fiber 28. Preferably, the second V-groove chip is identical to the V-groove chip 61.

Alternatively, the optical fiber is pressed against the fiducial plate AFTER the second V-groove chip is disposed on the optical fiber.

Figure 14A:
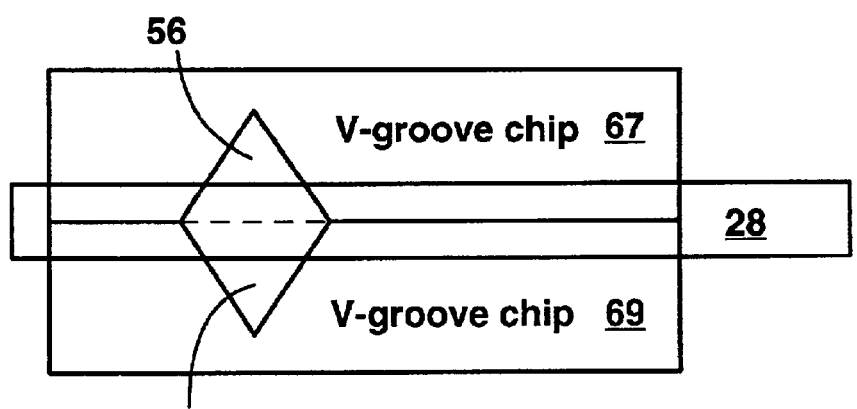
FIGS. 14a–14b illustrate a method for making the fiber arrays where the chips and optical fibers are cut in the same step.
Figure 14B:
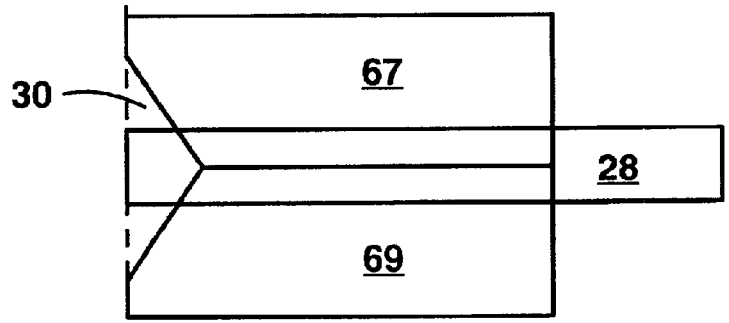

FIGS. 14a–14b illustrate a second method for making the fiber array used in the present invention:

FIG. 14a: The optical fiber 28 is disposed between two V-groove chips 67 69 in V-grooves (not visible). The V-groove chips have V-grooves 56 for forming the front face V-grooves 30.

FIG. 14b: A dicing saw is used to cut through the chips and the optical fiber 28 in the area of the V-grooves 56. The cut is made along dotted line 64. The cut forms the front face V-grooves 30.

Preferably, the dicing saw used to make the cut in FIG. 14b provides a relatively smooth endface for the optical fiber. If a smooth surface is not provided on the optical fiber endface, index matching liquid can be used between the fiber arrays. Optionally, the front face and optical fiber endfaces are polished after the cut is made. However, if polishing is performed, it must not remove too much material from the front face. Removing too much material from the front face will result in a large gap spacing 42 and an increased insertion loss for the switch.

Figure 15A:
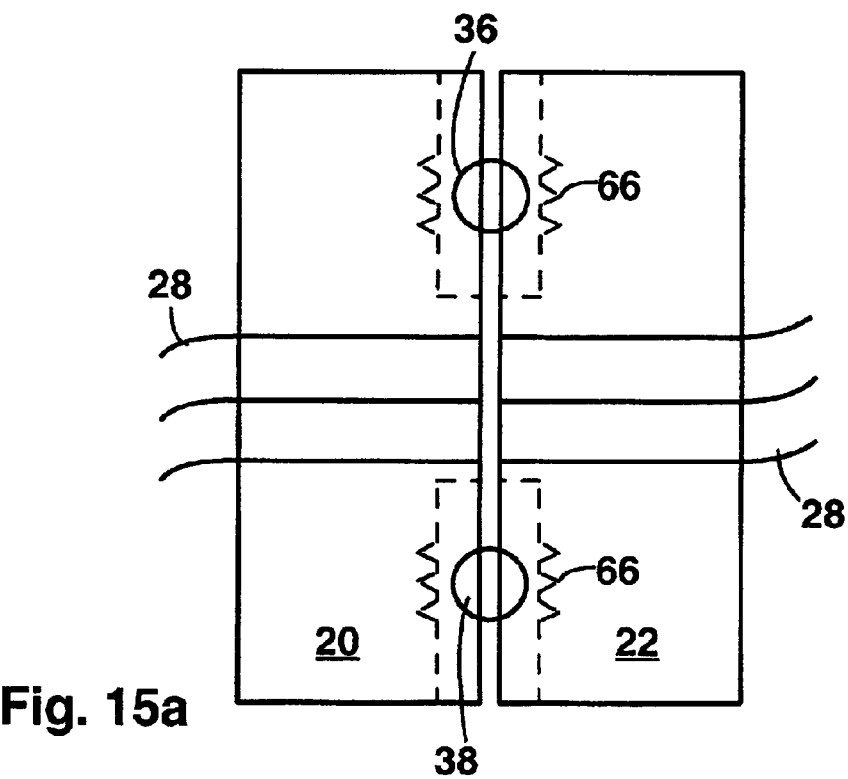
FIGS. 15a–15b show top views of a switch having notches in the front face grooves for providing passive transverse alignment.
Figure 15B:
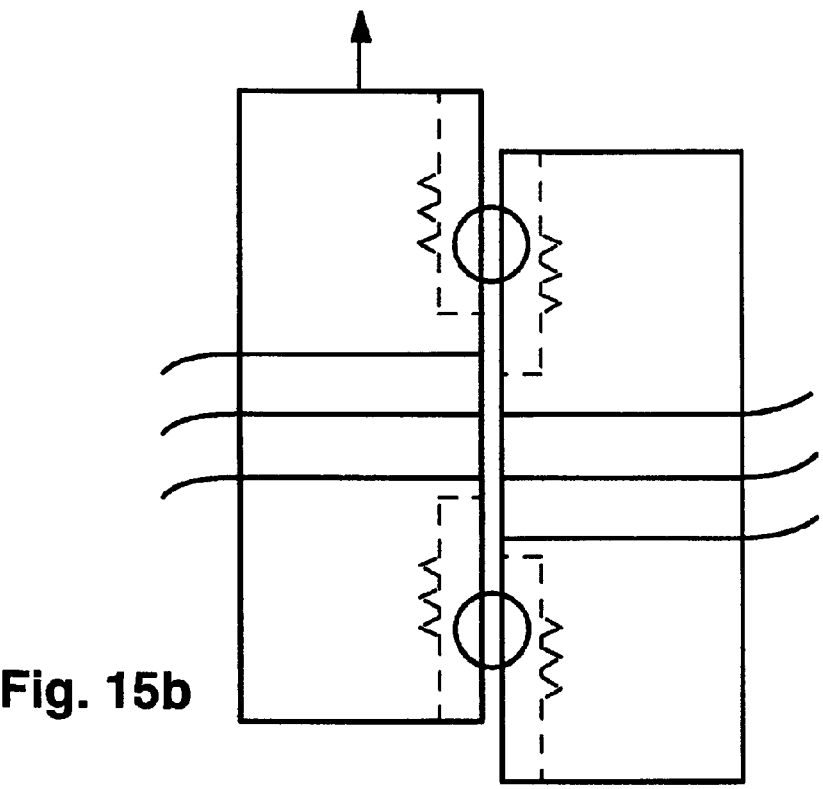

FIG. 15a–15b illustrate a preferred embodiment where the front face grooves have notches 66 for providing passive transverse alignment of the fiber arrays 20 22. The fiber arrays are pressed together slightly so that the spheres 36 'click' into the notches. The notches are spaced so that the optical fibers 28 are aligned when the notches are aligned. Each notch can be formed using anisotropic etching by providing a wide portion in the mask used to define the anisotropic etching. Optionally only one fiber array has notches, but it is preferable for both fiber arrays to have notches.

Figure 16A:
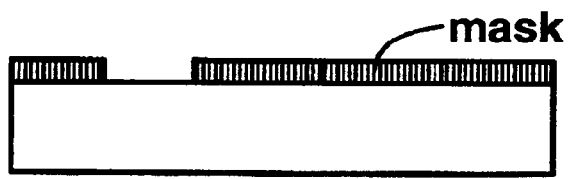
FIGS. 16a–16e illustrate a method for making the front face groove with an isotropic etch.

It is noted that the front face grooves can be formed by techniques other than anisotropic etching. For example, the front face grooves can also be formed by a dicing saw (preferably with a V-shaped blade) or isotropic etching. FIGS. 16a–16e Illustrate a method for forming the front face groove with an isotropic etch:

FIG. 16a: A mask (e.g. silicon nitride) is patterned on the silicon chip.

Figure 16B:

FIG. 16b: An isotropic etch is used to form a U-shaped groove 68.

Figure 16C:
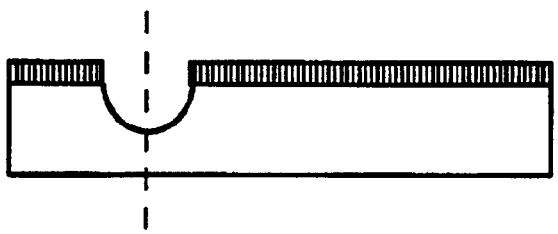

FIG. 16c: The U-shaped groove is cut along dotted line.

Figure 16D:
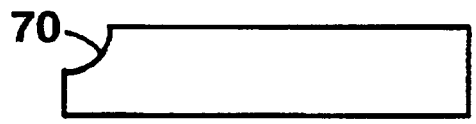

FIG. 16d: Th mask is removed. The chip has a curved, sloped surface 70.

Figure 16E:
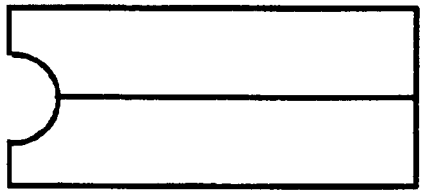

FIG. 16e: Two chips are assembled so that the front face groove 30 is formed from the curved, sloped surfaces 70.

The chip also has V-grooves for holding optical fibers which are not shown. The V-grooves can be made by anisotropic etching or a dicing saw.

Figure 17:
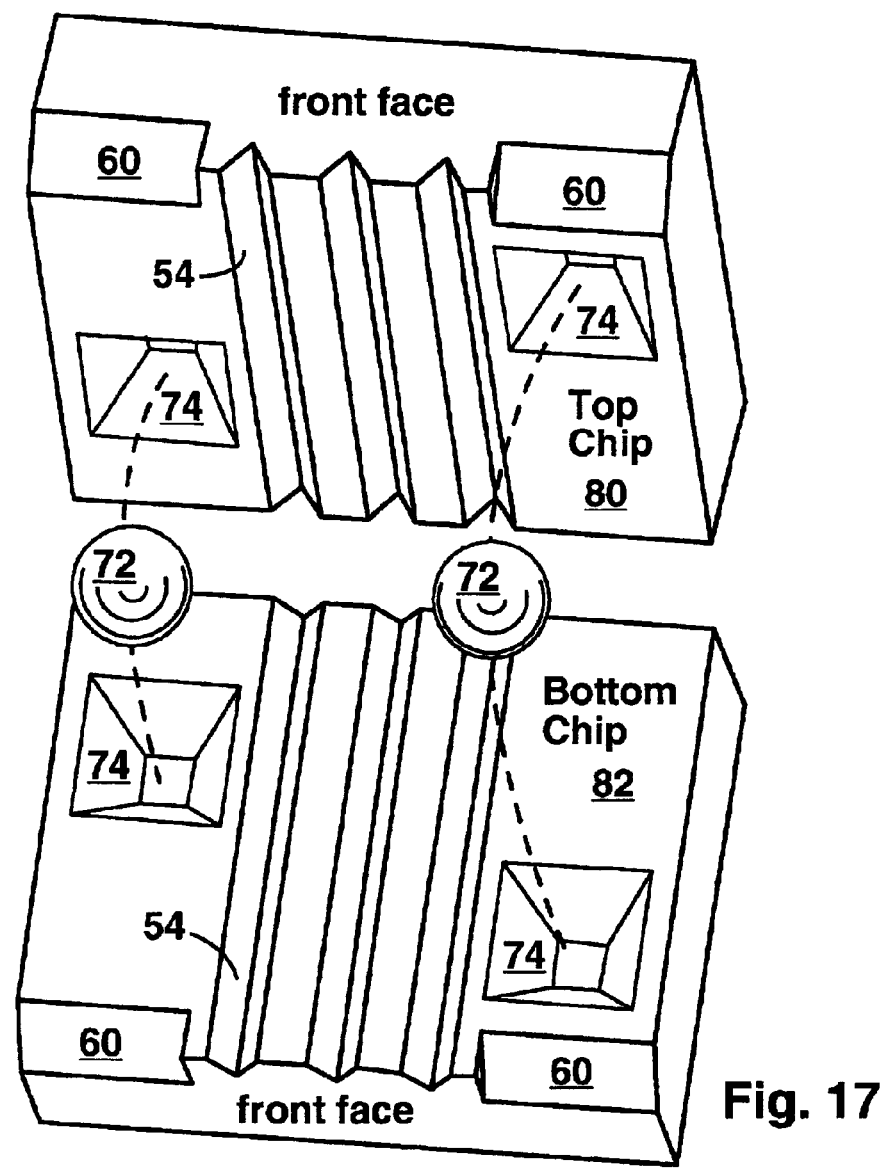
FIG. 17 shows an exploded view of a fiber array having alignment spheres for assuring alignment between top and bottom micromachined chips.

FIG. 17 shows an exploded view of a preferred embodiment for assembling the fiber arrays according to the present invention. Alignment spheres 72 are disposed in micromachined pits 74 between a top chip 80 and a bottom chip 82. The pits 74 can be made by anisotropic etching, for example. The pits and alignment spheres 72 assure that top chip 80 and bottom chip 82 are aligned to one another so that sloped surfaces 60 form front face grooves. Optical fibers (not shown) are disposed in the v-grooves 54. The alignment spheres 72 can be made of the same materials as the spheres 36.

Figure 18:
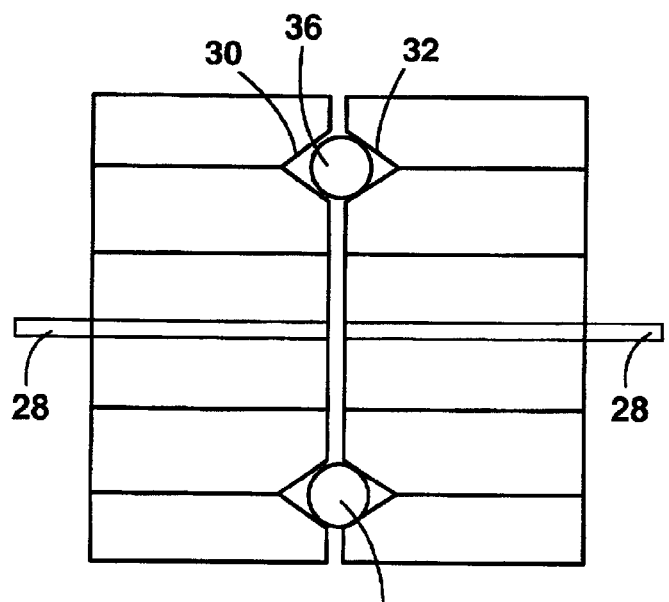
FIG. 18 shows a side view of an embodiment where the front face grooves and spheres are not located in the plane of the optical fibers.

FIG. 18 shows a side view of an alternative embodiment where the front face grooves 30 32 are located above and below the optical fibers 28. The front face grooves 30 32 and spheres 36 provide transverse motion for the fiber arrays, but the spheres and front face grooves are not located in the plane of the optical fibers 28. This device may require more than two stacked V-groove chips.

Figure 19:
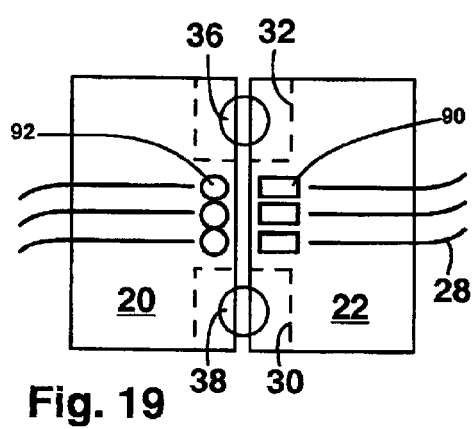
FIG. 19 shows an alternative embodiment having GRIN lenses and ball lenses for improved optical coupling.

FIG. 19 shows an alternative embodiment where the fiber arrays have GRIN lenses 90 or ball lenses 92. The GRIN lenses 90 and ball lenses 92 collimate and focus light from the fibers so that light is collimated in the space between the fiber arrays. The GRIN lenses and ball lenses can provide improved optical coupling, as known in the art of microoptics.

It is noted that the spheres 36 38 disposed between the fiber arrays 20 22 do not need to have an acurate spherical shape. The spheres 36 38 can have oblate or prolate spheroid shapes, for example. Switches with prolate or oblate spheres are understood to be within the scope of the present invention and appended claims. In case oblate or prolate spheroids are used, they should be oriented so that the fiber arrays maintain a constant spacing during translational motion (i.e. oriented so that the rotational symmetry axis is perpendicular to the plane of the fiber arrays).

Figure 20:
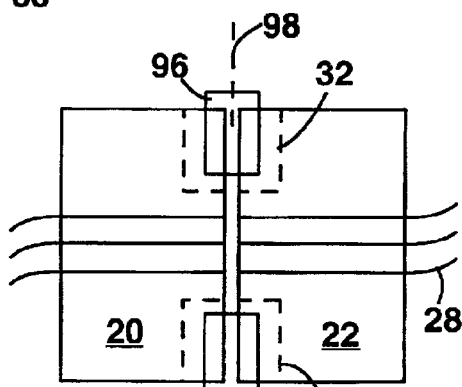
FIG. 20 shows an alternative embodiment having cylinders disposed between the fiber arrays. The fiber arrays move in a transverse direction by sliding on the cylinders.
Figure 21:
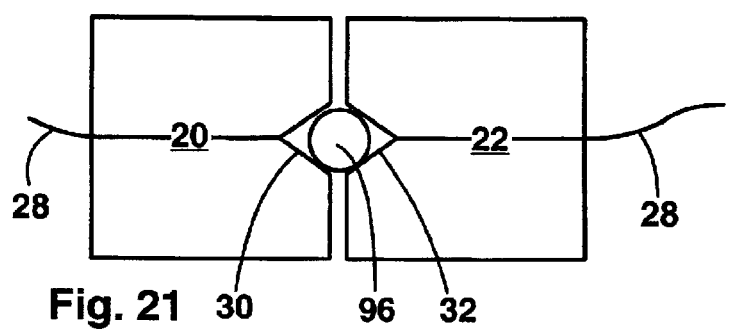
FIG. 21 shows a side view of an embodiment having cylinders instead of spheres.

It is also noted that the spheres 36 38 can be replaced with nonspheroidal, nonspherical objects such as cylinders. FIG. 20, for example, shows a top view of an embodiment where glass cylinders 96 (e.g., optical fiber sections) are used in place of the spheres 36 38. The cylinders 96 are oriented so that an axis 98 of the cylinders extends in the transverse direction. In this embodiment, the fiber arrays move in a transverse direction by sliding on the cylinders 96. The cylinders should be made of a material that provides smooth, low-stiction sliding. The cylinders can be made of polymers such as PTFE or polyethylene, for example. Also, the cylinders can have low-wear, low-friction coatings. FIG. 21 shows a side view of the embodiment having cylinders 96.

Also, the cylinders 96 can be replaced with cubes or other 3-dimensional solids. The present switch will operate by sliding on the object provided that the object has a suitably low sliding friction against the fiber array chips.

Figure 22:
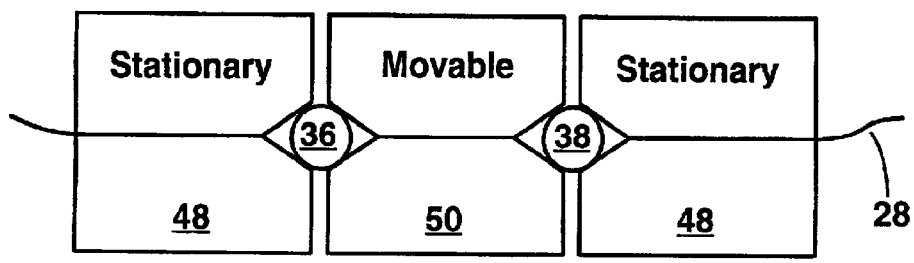
FIG. 22 shows a side view of a switch having two stationary fiber arrays and a central movable fiber array.

FIG. 22 shows a side view of the switch of FIG. 8. The switch has two stationary fiber arrays 48 and a single movable fiber array 50. The movable fiber array moves in a direction perpendicular to the page to provide switching action.

Figure 23:
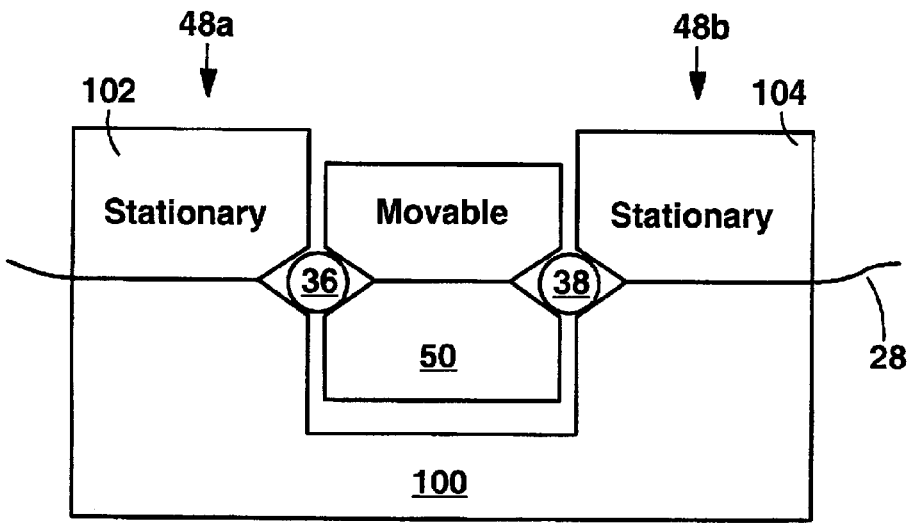
FIG. 23 shows a switch where two stationary fiber arrays are made from a shared monolithic piece of material.

FIG. 23 shows a side view of another embodiment where the two stationary arrays 48a 48b share a common base chip 100. The stationary fiber arrays have separate top V-groove chips 102 104.

Figure 24:
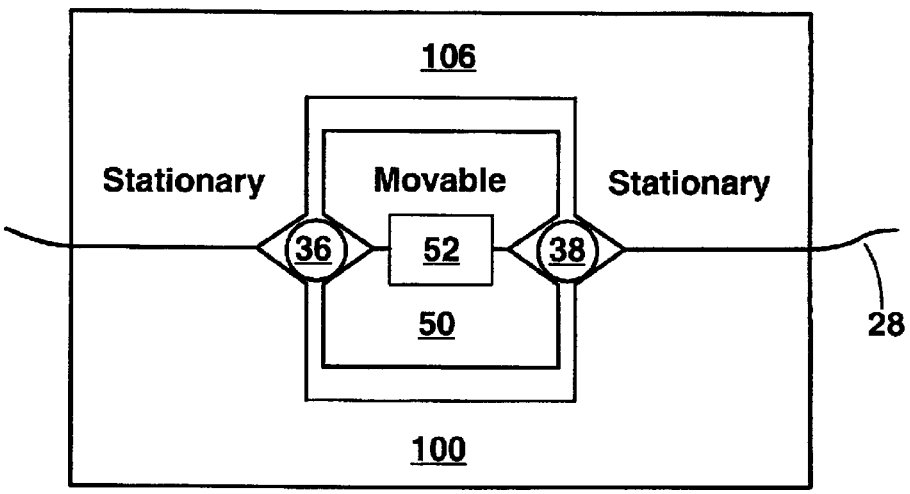
FIG. 24 shows a switch having a shared top chip and a shared bottom chip.

FIG. 24 shows a side view of another embodiment where the two stationary arrays are made from the common base chip 100 and a common top chip 106. The stationary arrays The stationary arrays provide a hole with the movable array 50 disposed in the hole.

In the present specification, the common base chip 100 and common top chip 106 are referred to generally as shared substrates. The shared substrates 100 106 can be monolithic or can be made from several bonded parts.

Preferably, the movable array 50 has an opening 52 so that optical fibers within the movable array can cross over one another.

Figure 25:
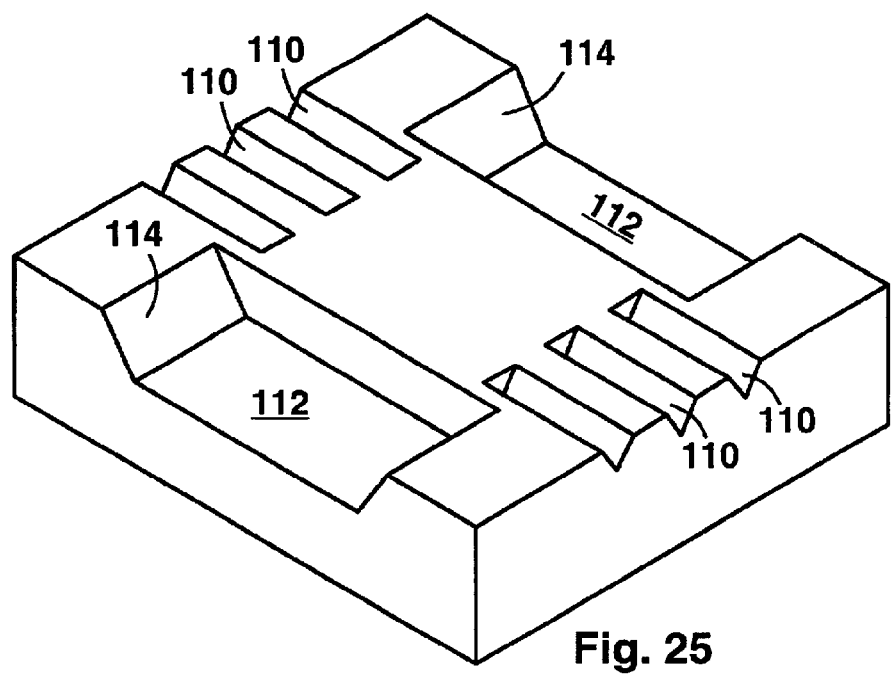
FIGS. 25–26 illustrate a preferred method for making a shared chip used in the switches of FIGS. 23 and 24.
Figure 26:
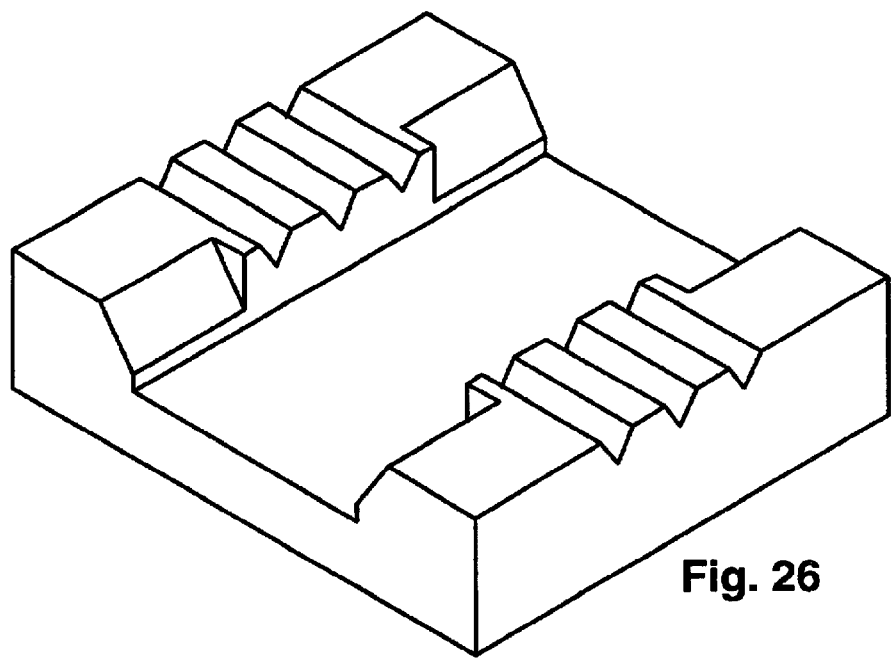

FIGS. 25 and 26 illustrate a preferred method for making the devices of FIGS. 23 and 24. FIG. 25 shows an anisotropically etched silicon chip having V-grooves 110 for optical fibers, and recessed areas 112 with sloping sidewalls 114. The sloping sidewalls provide surfaces for the spheres 36 38 to roll on. After the chip is etched as shown in FIG. 25, a dicing saw is used to cut out a middle portion of the chip. FIG. 26 shows the chip after the dicing saw cut. The chip shown in FIG. 26 can be used for the common base chip 100 or the common top chip 106.

It is also noted that the fiber arrays in the present invention can have the same or different fiber pitches. If the fiber arrays have different fiber pitches, then the present switch can provide a number of coupled 1×N switches. For example, if the arrays have pitches of 250 microns and 750 microns, then the switch will comprise 1×3 switches.

It is noted that the present invention is compatible with a large variety of actuating devices including piezoelectric actuators, stepper motors and magnetic actuators such as solenoids.

It will be clear to one skilled in the art that the above embodiment may be altered in many ways without departing from the scope of the invention. Accordingly, the scope of the invention should be determined by the following claims and their legal equivalents.

What is claimed is:

1. An optical fiber switch comprising:
    a) a first stationary optical fiber array having:
        1) a front face,
        2) an optical fiber terminating at the front face, and
        3) a front face groove disposed in the front face and extending in a transverse direction
    b) a second stationary optical fiber array having:
        1) a front face,
        2) an optical fiber terminating at the front face, and
        3) a front face groove disposed in the front face and extending in a transverse direction,
    c) a movable fiber array disposed between the stationary optical fiber arrays, the movable fiber array having:
        1) a front face,
        2) a rear face opposite the front face,
        3) an optical waveguide extending between the front face and the rear face,
        4) a front face groove disposed in the front face and extending in a transverse direction,
        5) a rear face groove disposed in the rear face and extending in a transverse direction,
    d) an object disposed in the front face grooves between the first stationary fiber array and the movable fiber array;
    e) an object disposed in the front face groove and rear face grooves between the second stationary fiber array and the movable fiber array;
    whereby the movable array moves in a transverse direction by rolling or sliding on the objects.

2. The optical fiber switch of claim 1 wherein the objects are spheres.

3. The optical fiber switch of claim 1 wherein the objects are spheroids.

4. The optical fiber switch of claim 1 wherein the objects are cylinders oriented with cylinder axes extending in the transverse direction.

5. The optical fiber switch of claim 1 wherein the objects are optical fiber segments.

6. The optical fiber switch of claim 1 wherein the fiber arrays comprise anisotropically etched silicon V-groove chips and the optical fibers are disposed in V-grooves, and the front face grooves comprise anisotropically etched V-grooves.

7. The optical fiber switch of claim 1 wherein the objects are in contact with surfaces of the front face grooves.

8. The optical fiber switch of claim 1 wherein the front faces define a gap spacing in the range of about 0.5 to 15 microns.

9. The optical fiber switch of claim 1 wherein the front faces are oriented at a angle of about 3–15 degrees from perpendicular to the optical fibers so that back reflection is reduced.

10. The optical fiber switch of claim 1 wherein the front face grooves and rear face groove comprise notches for providing passive transverse positioning of the fiber arrays.

11. The optical fiber switch of claim 1 wherein the front face grooves and rear face groove comprise anisotropically etched surfaces.

12. The optical fiber switch of claim 1 wherein the front face grooves and read face groove comprise isotropically etched surfaces.

13. The optical fiber switch of claim 1 wherein at least one fiber array includes an alignment sphere and a micromachined pit.

14. The optical fiber switch of claim 1 wherein the front face grooves and rear face groove have flat surfaces.

15. The optical fiber switch of claim 1 wherein the front face grooves and rear face groove have curved surfaces.

16. The optical fiber switch of claim 1 wherein the first stationary fiber array and the second stationary fiber array comprise a shared substrate.

17. The optical fiber switch of claim 1 wherein the first stationary fiber array and the second stationary fiber array comprise a shared common base chip and a shared common top chip.

* * * * *